United States Patent
Katamoto

(10) Patent No.: US 9,298,308 B2
(45) Date of Patent: Mar. 29, 2016

(54) TOUCH PANEL APPARATUS COMPENSATING FOR OUT-OF-ORDER VIBRATING DEVICES

(71) Applicant: Kyocera Document Solutions Inc., Osaka (JP)

(72) Inventor: Tohru Katamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/316,824

(22) Filed: Jun. 27, 2014

(65) Prior Publication Data
US 2015/0002427 A1   Jan. 1, 2015

(30) Foreign Application Priority Data
Jun. 28, 2013 (JP) ................ 2013-136746

(51) Int. Cl.
*G06F 3/041* (2006.01)
*G06F 3/01* (2006.01)

(52) U.S. Cl.
CPC ............. *G06F 3/0416* (2013.01); *G06F 3/016* (2013.01)

(58) Field of Classification Search
CPC ....................... G06F 3/03547–3/047
USPC .................................................. 345/173–174
See application file for complete search history.

(56) References Cited

U.S. PATENT DOCUMENTS 7,515,239 B2 *   4/2009   Tung et al. .................... 349/149

FOREIGN PATENT DOCUMENTS

| JP | 2005-258666 A | 9/2005 | |
|---|---|---|---|
| JP | 2006-127010 A | 5/2006 | |
| JP | 2008-217237 A | 9/2008 | |
| JP | 2013-037542 A | 2/2013 | |
| WO | WO 2012/063165 A1 * | 5/2012 | ............. G06F 3/01 |

* cited by examiner

*Primary Examiner* — Roy Rabindranath
(74) *Attorney, Agent, or Firm* — James W. Judge

(57) ABSTRACT

A touch panel apparatus includes a touch panel, a plurality of vibrating devices, and a vibration drive control unit. The touch panel is divided into a plurality of areas. The plurality of vibrating devices are preliminary assigned to the respective plurality of areas. The vibration drive control unit is configured to: drive the vibrating device assigned to an area corresponding to a pressed position while the touch panel is pressed; and drive the vibrating device assigned to another area to cause an area corresponding to the pressed position to vibrate if the vibrating device is not normally driven.

7 Claims, 5 Drawing Sheets

TOUCH PANEL APPARATUS COMPENSATING FOR OUT-OF-ORDER VIBRATING DEVICES

CROSS-REFERENCE TO RELATED APPLICATION

This application is based upon, and claims the benefit of priority from, corresponding Japanese Patent Application No. 2013-136746 filed in the Japan Patent Office on Jun. 28, 2013, the entire contents of which are incorporated herein by reference.

BACKGROUND

Unless otherwise indicated herein, the description in this section is not prior art to the claims in this application and is not admitted to be prior art by inclusion in this section.

Recently, a touch panel apparatus that can be operated by touching an operation key displayed on a screen has been popular. With such a touch panel apparatus, a technique that feeds back sense of pressing the operation key to an operator by sense of touch has been known.

In the technique, vibrating devices are located in the touch panel. While the operator touches an operation surface on the touch panel, a drive signal is applied to the vibrating devices, thus the touch panel is vibrated. In the technique, to check whether the vibrating devices are damaged or not, the vibrating devices are periodically vibrated while the equipment is not used. When a piezoelectric voltage becomes equal to or less than a reference voltage, the touch panel notifies its abnormality.

SUMMARY

A touch panel apparatus according to the disclosure includes a touch panel, a plurality of vibrating devices, and a vibration drive control unit. The touch panel is divided into a plurality of areas. The plurality of vibrating devices are preliminary assigned to the respective plurality of areas. The vibration drive control unit is configured to: drive the vibrating device assigned to an area corresponding to a pressed position while the touch panel is pressed; and drive the vibrating device assigned to another area to cause an area corresponding to the pressed position to vibrate if the vibrating device is not normally driven.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
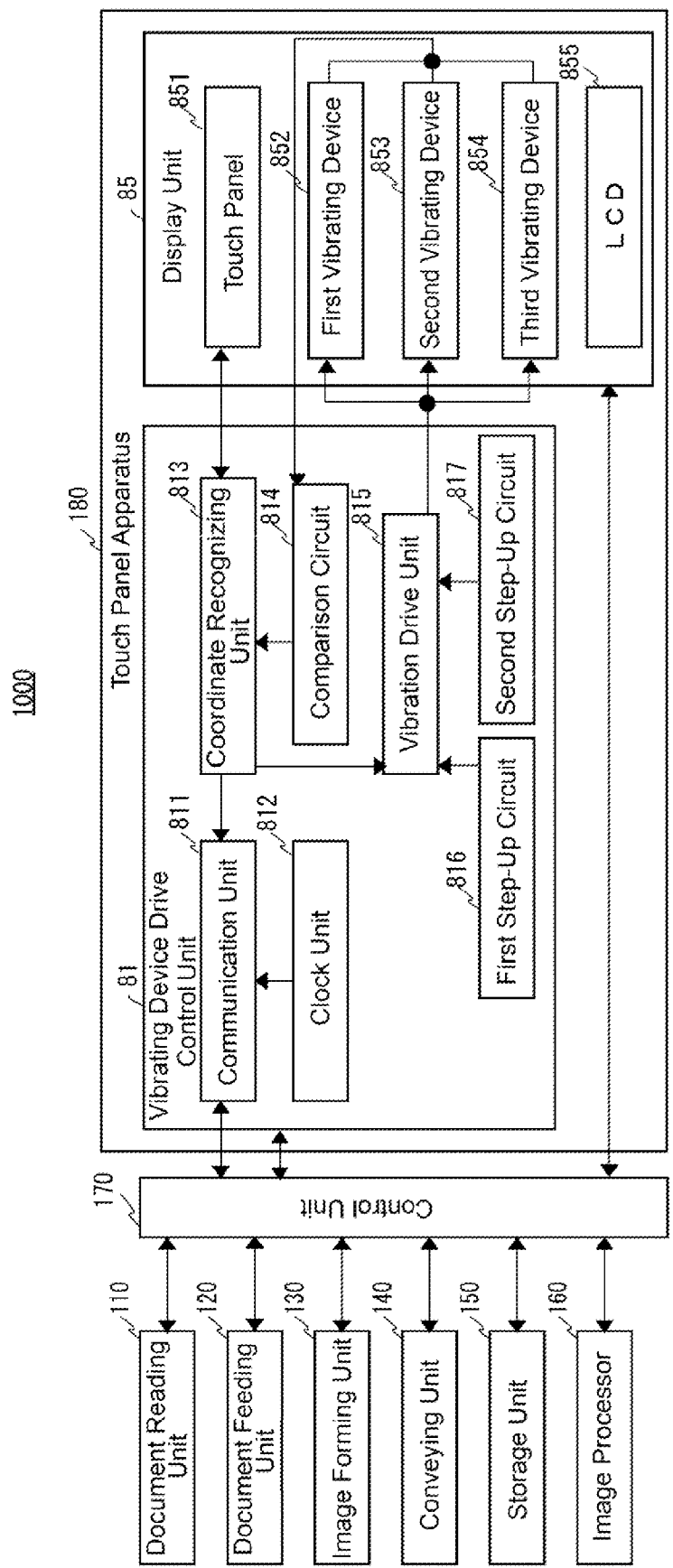
FIG. 1 illustrates a schematic configuration of an image forming apparatus including a touch panel apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Next, the following specifically describes an embodiment of the disclosure with reference to the drawings. An image forming apparatus 1000 is a copier that includes a touch panel apparatus 180 of an embodiment. With reference to FIG. 1, the image forming apparatus 1000 includes a document reading unit 110, a document feeding unit 120, an image forming unit 130, a conveying unit 140, a storage unit 150, an image processor 160, and a control unit 170. In this embodiment, the image forming apparatus 1000 is described as a copier. However, it is needless to say that the image forming apparatus 1000 includes a scanner, a multi-functional peripheral, or a similar apparatus.

The touch panel apparatus 180, the document reading unit 110, the document feeding unit 120, the image forming unit 130, and the conveying unit 140 (a paper feed roller, a conveyance roller, and a discharge roller (not illustrated)) of the image forming apparatus 1000 are connected to the control unit 170 and are operated and controlled by the control unit 170. The storage unit 150 and the image processor 160 are also connected to the control unit 170.

The document reading unit 110 has a scanner function. The document reading unit 110 reads documents set to the document feeding unit 120 or a platen glass (not illustrated) to obtain image data and outputs the obtained image data to the image forming unit 130.

The image forming unit 130 transfers a toner image, which is formed on a photoreceptor drum based on image data obtained from the document reading unit 110, on a recording sheet by a developing unit and prints the image.

The conveying unit 140 conveys recording sheets housed in a paper sheet feeder (not illustrated) to the image forming unit 130 according to an image forming process by the image forming unit 130, and discharges the recording sheets on which images are printed to a discharge tray.

The control unit 170 is an information processor such as a microcomputer with a Read Only Memory (ROM), Random Access Memory (RAM), or a similar memory. The ROM stores control programs for operation control of the image forming apparatus 1000. The control unit 170 reads the control programs stored in the ROM, and loads the control programs to the RAM. Thus, the control unit 170 controls the entire apparatus according to predetermined instruction information or similar information input from the touch panel apparatus 180.

The storage unit 150 is a storage unit such as a semiconductor memory and a Hard Disk Drive (HDD). The storage unit 150 stores image data or similar data on the document read by the document reading unit 110.

The image processor 160 is a unit that performs a predetermined image process on image data. For example, the image processor 160 performs image an enhancement process, such as a scaling, a density adjustment, and a tone adjustment.

The touch panel apparatus 180 is located at the image forming apparatus 1000. The touch panel apparatus 180 configures settings of the image forming apparatus 1000 and executes operation instructions. The touch panel apparatus 180 includes a display unit 85 and a vibrating device drive control unit 81.

Figure 2:
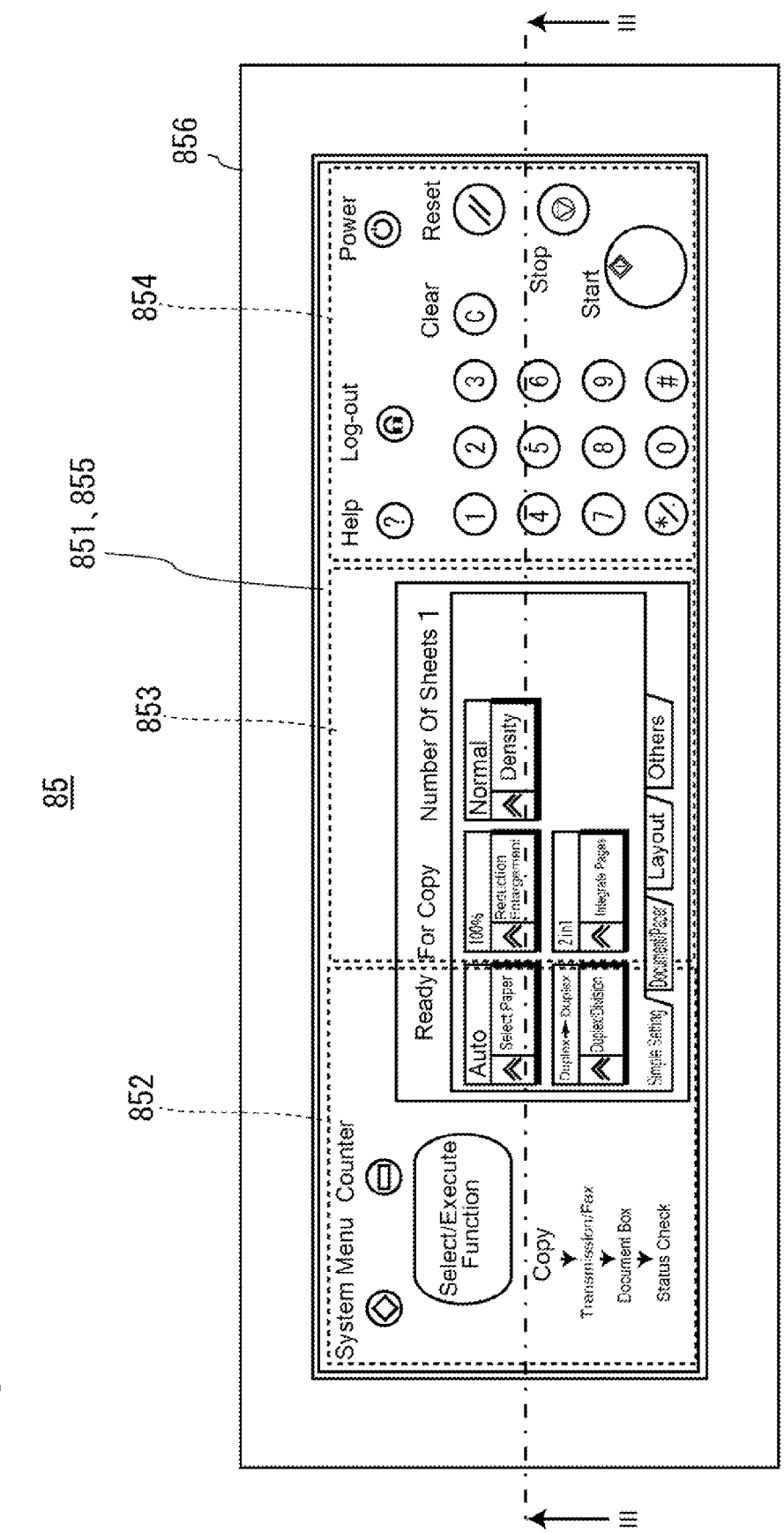
FIG. 2 illustrates an exemplary configuration of a display unit according to the one embodiment.
Figure 3:
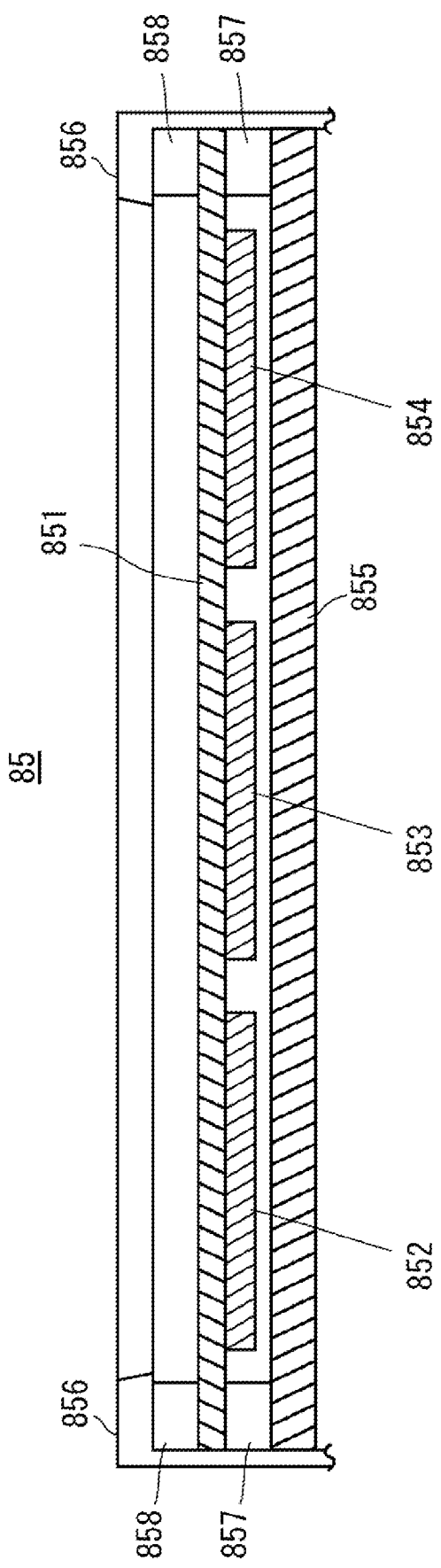
FIG. 3 illustrates a cross section taken along the line III-III of the display unit according to the one embodiment.

Specifically, with reference to FIG. 2 and FIG. 3, the display unit 85 includes a touch panel 851, a first vibrating device 852, a second vibrating device 853, a third vibrating device 854, and a Liquid Crystal Display (LCD) 855. In the following description, when the first vibrating device 852, the second vibrating device 853, and the third vibrating device 854 need not be particularly distinguished, they are simply referred to as a "vibrating devices."

The LCD 855 displays various operation keys for receiving operation inputs, such as a numeric keypad, a reset key, a stop key, and various operation keys. The numeric keypad is to input values such as the number of sheets to be printed. The reset key is to input an instruction for initializing setting information. The stop key is to stop a copy operation, deletes an input value, and performs a similar operation. The start key is to input an output instruction for starting a printing operation.

The touch panel 851 is located at a display surface of the LCD 855. The touch panel 851 detects an input by pressing with a fingertip of an operator, a stylus, or a similar tool and outputs a coordinate corresponding to a position where the input is detected to a coordinate recognizing unit 813. Thus, the touch panel 851 accepts an operation to the operation key displayed on the LCD 855. As the touch panel 851, for example, a resistance film system and a capacitive touch-screen can be used. This embodiment uses a system with a structure of bending (strain) by slight amount according to pressing force upon pressurization.

The first vibrating device 852, the second vibrating device 853, and the third vibrating device 854 are constituted by an element such as a piezoelectric element and are located so as to cover the operation surface of the touch panel 851. The first vibrating device 852, the second vibrating device 853, and the third vibrating device 854 function as a vibrating unit that vibrate the touch panel 851.

With reference to FIG. 3, a housing 856 houses and holds the LCD 855. Above the LCD 855, the touch panel 851 is sandwiched and supported by elastic members 857 and 858. The housing 856 is provided with an upper cover that covers peripheral regions of the LCD 855 and the touch panel 851. At a back surface of the touch panel 851 at a portion covered with the upper cover of the housing 856, the first vibrating device 852, the second vibrating device 853, and the third vibrating device 854 are stuck.

Figure 4:
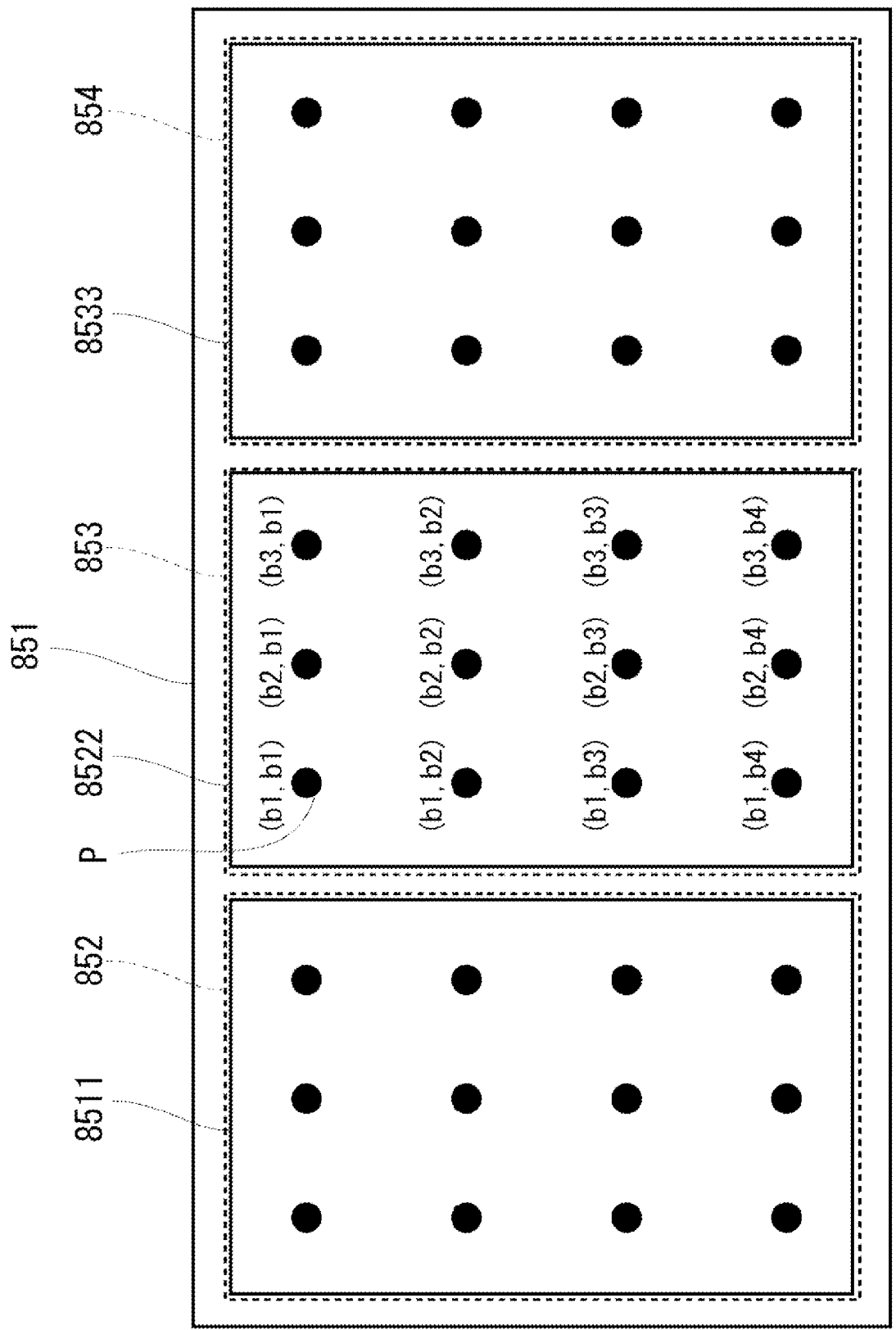
FIG. 4 illustrates a relationship between the touch panel and vibrating devices according to the one embodiment.

Specifically, with reference to FIG. 4, the touch panel 851 is divided into a first area 8511, a second area 8522, and a third area 8533. The first vibrating device 852 is located at the back surface of the first area 8511. The second vibrating device 853 is located at the back surface of the second area 8522. The third vibrating device 854 is located at the back surface of the third area 8533. The first area 8511, the second area 8522, and the third area 8533 correspond to a plurality of coordinates. As one example, FIG. 4 illustrates an example where the second area 8522 corresponds to coordinates (b1, b1) to (b3, b4). When the operator presses the touch panel 851, the coordinate recognizing unit 813 obtains a coordinate P corresponding to a pressed position on the touch panel 851.

Hereinafter, an area that corresponds to the coordinate P corresponding to the pressed position on the touch panel 851 is referred to as a "vibrating area", and an area of the vibrating device vibrating instead of the vibrating device of the vibrating area while the vibrating device in the vibrating area is damaged or in a similar failure is referred to as a "complement area." The complement area becomes an area at the closest distance from the coordinate P (excluding the vibrating area), which will be described later. For example, as illustrated in FIG. 4, when the coordinate P is (b1, b1), the vibrating area is the second area 8522 and the complement area is the first area 8511.

The vibrating device needs not to always correspond to the area on the touch panel 851 on a one-to-one basis. One vibrating device may be assigned so as to vibrate two vibrating areas. One vibrating device may be assigned so as to vibrate equal to or more than three vibrating areas. The vibrating devices may be freely located. Areas on the touch panel 851 may each correspond to one coordinate.

With reference to FIG. 1, after obtaining the coordinate P, the coordinate recognizing unit 813 outputs the coordinate value to the control unit 170 via a communication unit 811. The communication unit 811 communicates with the control unit 170 based on an internal clock output from a clock unit 812. After obtaining the coordinate P via the communication unit 811, the control unit 170 performs a process such as a key operation corresponding to the coordinate P. After obtaining the coordinate P, the coordinate recognizing unit 813 identifies the area (the vibrating area) on the touch panel 851 that corresponds to the coordinate P. Then, the coordinate recognizing unit 813 notifies information that the area is the vibrating area and the area information of a vibration drive unit 815. Assume that the coordinate recognizing unit 813 preliminary obtains a correspondence relationship between the obtained coordinates P and the respective areas on the touch panel 851 by referring to, for example, a correspondence table stored in the storage unit 150 or a similar unit.

After obtaining information that the area is the vibrating area and the area information, the vibration drive unit 815 drives the first vibrating device 852, the second vibrating device 853, or the third vibrating device 854 corresponding to the obtained area information using a voltage from a first step-up circuit 816. This vibrates the vibrating area on the touch panel 851.

An output voltage from the first step-up circuit 816 is set as a usual driving voltage to vibrate the vibrating area (for example, 20 V). On the other hand, if the vibrating device of the vibrating area is damaged or in a similar failure, a second step-up circuit 817 vibrates the vibrating area with the vibrating device of the complement area, which will be described later. Accordingly, the output voltage from the second step-up circuit 817 is set higher than the output voltage from the first step-up circuit 816 (for example, 40 V).

A comparison circuit 814 is connected the first vibrating device 852, the second vibrating device 853, and the third vibrating device 854. The comparison circuit 814 outputs an output voltage based on a comparison between: the predetermined reference voltage; and the output voltages of the first vibrating device 852, the second vibrating device 853, and the third vibrating device 854 to the coordinate recognizing unit 813. Specifically, if any of the first vibrating device 852, the second vibrating device 853, and the third vibrating device 854 is driven, the comparison circuit 814 is configured to change the output voltage according to the piezoelectric voltage. Accordingly, the coordinate recognizing unit 813 detects whether the vibrating device of the area notified to the vibration drive unit 815 normally vibrates or not via the comparison circuit 814. For example, the coordinate recognizing unit 813 may determine whether the vibrating device normally vibrates or not by whether a predetermined constant voltage is fed back from the comparison circuit 814 or not.

When it is determined that the vibrating device is not normally driven based on the output voltage from the comparison circuit 814, the coordinate recognizing unit 813 identifies the area at the closest distance from the coordinate P corresponding to the position pressed by the operator other than the vibrating area (the complement area). When the complement area is identified, the coordinate recognizing unit 813 outputs information that the area is the complement area and the area information to the vibration drive unit 815.

When the vibration drive unit 815 has obtained the information that the area is the complement area and the area information, the vibration drive unit 815 drives the first vibrating device 852, the second vibrating device 853, or the third vibrating device 854 assigned to the complement area based on the output voltage from the second step-up circuit 817. Since the vibrating device of the complement area is driven at higher voltage than the output voltage from the usual first step-up circuit 816 by the second step-up circuit 817, the area on the touch panel 851 vibrates in a wider range than usual. This vibrates the vibrating area and feeds back operational feeling to the operator. That is, the area at the position on the touch panel 851 pressed by the operator is vibrated by the vibrating device of the area different from the vibrating device of the area.

Figure 5:
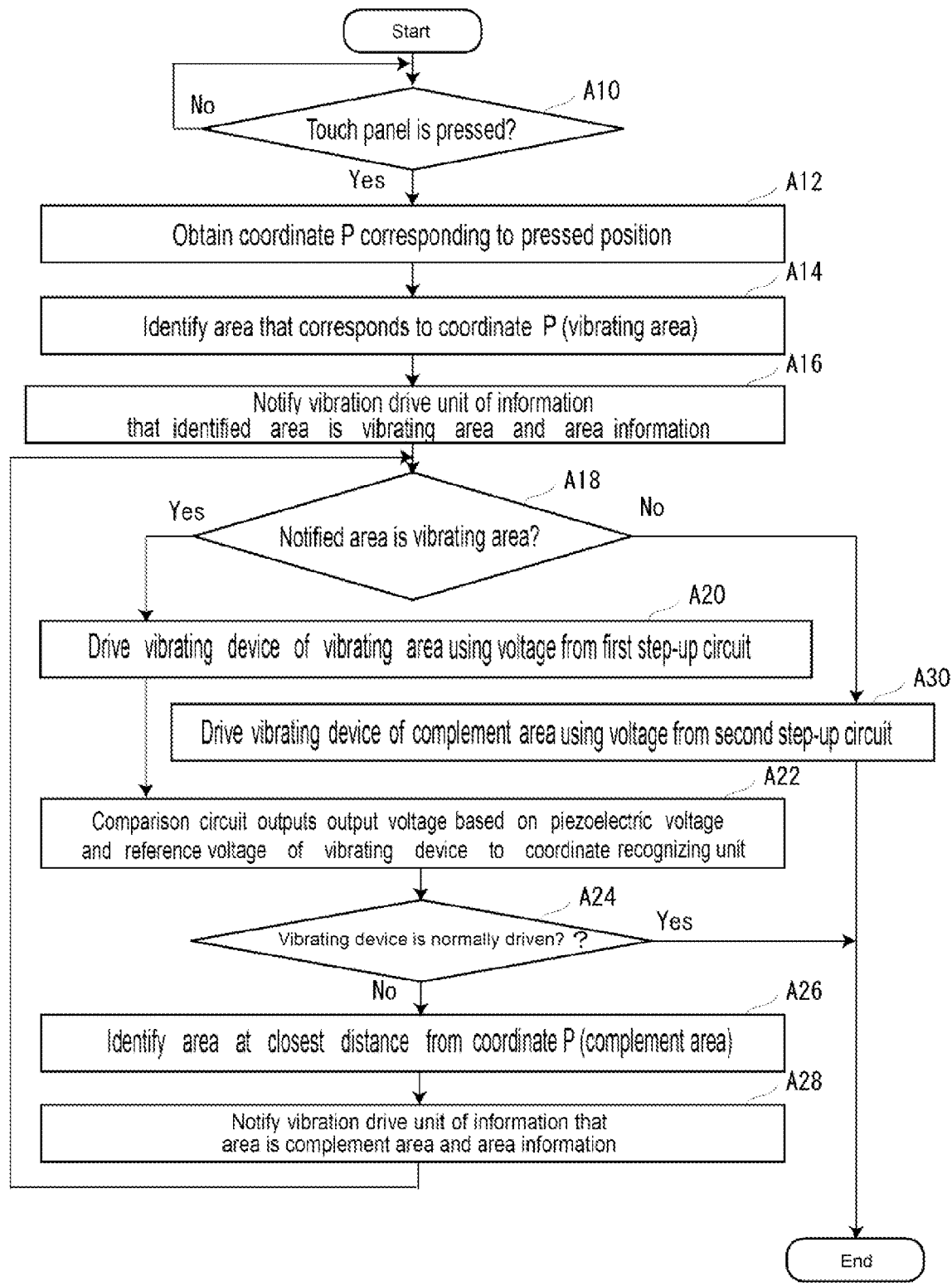
FIG. 5 illustrates a flow of processes for the touch panel apparatus according to the one embodiment.

Specifically, with reference to FIG. 5, the following describes a flow of processes that the touch panel apparatus 180 feeds back sense of touch when the touch panel 851 is operated.

First, in Step A10, the coordinate recognizing unit 813 determines whether or not the touch panel 851 is pressed. If No in Step A10, the coordinate recognizing unit 813 repeats Step A10. If Yes in Step A10, in Step A12, the coordinate recognizing unit 813 obtains the coordinate P corresponding to the pressed position on the touch panel 851. In Step A14, the coordinate recognizing unit 813 identifies the area on the touch panel 851 that corresponds to the coordinate P. In Step A16, the coordinate recognizing unit 813 notifies the vibration drive unit 815 of information that the identified area is the vibrating area and the area information.

In Step A18, the vibration drive unit 815 determines whether or not the area information notified from the coordinate recognizing unit 813 is the vibrating area. If Yes in Step A18, in Step A20, the vibration drive unit 815 drives the vibrating device of the notified area using the voltage from the first step-up circuit 816.

In Step A22, the comparison circuit 814 outputs the output voltage based on a comparison between the reference voltage and the piezoelectric voltage of the vibrating device to the coordinate recognizing unit 813.

In Step A24, the coordinate recognizing unit 813 determines whether or not the vibrating device of the area notified to the vibration drive unit 815 is normally driven based on the output voltage from the comparison circuit 814. If Yes in Step A24, this process is terminated. On the other hand, if No in Step A24, in Step A26, the coordinate recognizing unit 813 identifies the area at the closest distance from the coordinate P other than the vibrating area as the complement area. In Step A28, the coordinate recognizing unit 813 notifies the vibration drive unit 815 of information that the area is the complement area and the area information of the complement area, and returns the process to Step A18.

If No in Step A18, in Step A30, the vibration drive unit 815 drives the vibrating device of the complement area using the voltage from the second step-up circuit 817 and terminates this process.

Thus, if one of the vibrating devices is damaged, instead of the damaged vibrating device, another normal vibrating device vibrates. This can eliminate downtime of the equipment and improve reliability.

Thus, according to the embodiment, even if a damaged vibrating device is present, instead of the damaged vibrating device, a normal vibrating device can vibrate. That is, even if a part of the vibrating devices is damaged, another vibrating device can compensate the vibration of the area assigned to the damaged vibrating device. This ensures continuing normal operation of the image forming apparatus 1000.

For example, like the coordinate (b2, b1) illustrated in FIG. 4, when the coordinate P is at the center of the area, the coordinate recognizing unit 813 identifies the first area 8511 and the third area 8533 as the complement areas based on the coordinate P. Thus, if a plurality of identified complement areas exist, the coordinate recognizing unit 813 may set any one of the areas as the complement area or may set the plurality of areas as the complement areas. When the plurality of areas are set as the complement areas, the vibration drive unit 815 may simultaneously drive the plurality of the vibrating devices of the complement areas with the usual first step-up circuit 816, not with the second step-up circuit 817.

Further, the coordinate recognizing unit 813 may determine whether or not the vibrating device of the complement area is normally driven, as well as the vibrating device of the usual area, based on the output voltage from the comparison circuit 814. When it is determined that the vibrating device of the complement area is damaged or in a similar failure, the coordinate recognizing unit 813 may identify the area at the closest distance from the coordinate P next to the areas identified up to the present (the vibrating area and the complement area already notified to the vibration drive unit 815) as the complement area and may drive the vibrating device of the complement area via the vibration drive unit 815.

For example, when the second area 8522 (vibrating area) is vibrated corresponding to the coordinate P illustrated in FIG. 4, it is assumed that the coordinate recognizing unit 813 determines that the second vibrating device 853 is not normally driven and the vibrating device of the first area 8511 notified as the complement area is not normally driven as well. Then, the coordinate recognizing unit 813 notifies the vibration drive unit 815 of the third area 8533 as the complement area closest to the coordinate P next to the first area 8511 identified up to the present and causes the third vibrating device 854 to vibrate. When vibrating the third vibrating device 854, the vibration drive unit 815 may drive the third vibrating device 854 using a voltage of a step-up circuit at a higher voltage than a voltage of the second step-up circuit 817, not the second step-up circuit 817.

FIG. 4 illustrates exemplary three areas and three vibrating devices. However, the embodiment is similarly applicable to a plurality of areas and a plurality of vibrating devices arranged in a matrix. In this case, the position of the complement area may be far away from the vibrating area. Accordingly, to cause the vibration of vibrating device of the complement area to reach the vibrating area, step up circuits may be disposed not only by two stages but equal to or more than three stages, and the vibrating device may be driven at a higher voltage from the step up circuits.

The disclosure is not limited to the above described embodiments. Needless to say, various modifications can be made within a scope not departing from the spirit of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A touch panel apparatus, comprising:
   a touch panel divided into a plurality of areas, at least one coordinate being set inside each of the plurality of areas;
   a plurality of vibrating devices preliminarily assigned to the respective plurality of areas; and
   a vibration drive control unit configured to drive the vibrating device, as a first vibrating device, assigned to an area corresponding to a pressed position while the touch panel is pressed; wherein the vibration drive control unit includes
   a coordinate recognition unit configured to identify an area at a closest distance from the coordinate corresponding to the pressed position among the at least one coordinates if the first vibrating device does not drive normally, and
   a driving unit configured to drive the vibrating device, as a second vibrating device, assigned to the area identified by the coordinate recognition unit so as to cause the area corresponding to the pressed position to vibrate.

2. The touch panel apparatus according to claim 1, wherein the driving unit is configured to drive the second vibrating device at a voltage higher than voltage at which the first vibrating device is driven to vibrate the area corresponding to the pressed position.

3. The touch panel apparatus according to claim 1, wherein the driving unit is configured to, if a plurality of the closest distance areas are identified by the coordinate recognition unit, drive second vibrating devices, of the plurality of identified areas, at a voltage approximately the same as voltage at which the first vibrating device is driven to vibrate the area corresponding to the pressed position.

4. The touch panel apparatus according to claim 1, wherein the coordinate recognition unit is configured to, if the second vibrating device does not drive normally, identify an area next-closest to the area assigned to the second vibrating device.

5. An image forming apparatus, comprising the touch panel apparatus according to claim 1.

6. A method for controlling a touch panel apparatus, comprising:
   preparing a touch panel divided into a plurality of areas, with at least one coordinate being set inside each of the plurality of areas, and a plurality of vibrating devices preliminarily assigned to the respective plurality of areas;
   driving the vibrating device, as a first vibrating device, assigned to an area corresponding to a pressed position while the touch panel is pressed; and
   driving the vibrating device assigned to another area to cause an area corresponding to the pressed position to vibrate if the first vibrating device does not drive normally; wherein the driving the vibrating device includes
   identifying an area at a closest distance from the coordinate corresponding to the pressed position among the at least one coordinates if the first vibrating device does not drive normally, and
   driving the vibrating device, as a second vibrating device, assigned to the area identified by the identifying so as to cause the area corresponding to the pressed position to vibrate.

7. A non-transitory computer-readable recording medium storing a touch panel control program for controlling a touch panel including a touch panel divided into a plurality of areas and a plurality of vibrating devices preliminarily assigned to the respective plurality of areas, with at least one coordinate being set inside each of the plurality of areas, the touch panel control program causing the touch panel to function as a vibration drive control unit configured to:
   drive the vibrating device, as a first vibrating device, assigned to an area corresponding to a pressed position while the touch panel is pressed; and
   drive the vibrating device assigned to another area to cause an area corresponding to the pressed position to vibrate if the first vibrating device does not drive normally; wherein the touch panel control program causes the touch-panel vibration drive control unit to function as
   a coordinate recognition unit configured to identify an area at a closest distance from the coordinate corresponding to the pressed position among the at least one coordinates if the first vibrating device does not drive normally, and
   a driving unit configured to drive the vibrating device, as a second vibrating device, assigned to the area identified by the coordinate recognition unit so as to cause the area corresponding to the pressed position to vibrate.

* * * * *